(12) United States Patent
Kemp

(10) Patent No.: US 10,598,019 B1
(45) Date of Patent: Mar. 24, 2020

(54) TURBINE ENGINE WITH A FIRE CHAMBER AND A HELICAL FAN

(71) Applicant: Carl W. Kemp, Gainsville, TX (US)

(72) Inventor: Carl W. Kemp, Gainsville, TX (US)

( * ) Notice: Subject to any disclaimer, the term of this patent is extended or adjusted under 35 U.S.C. 154(b) by 78 days.

(21) Appl. No.: 15/643,915

(22) Filed: Jul. 7, 2017

Related U.S. Application Data

(60) Provisional application No. 62/359,258, filed on Jul. 7, 2016.

(51) Int. Cl.
*F01D 5/04* (2006.01)
*F02C 5/02* (2006.01)
*F02C 7/266* (2006.01)

(52) U.S. Cl.
CPC ............ *F01D 5/048* (2013.01); *F02C 5/02* (2013.01); *F02C 7/266* (2013.01); *F05D 2240/30* (2013.01); *F05D 2240/35* (2013.01)

(58) Field of Classification Search
CPC .... F02C 3/14; F02C 3/16; F02C 3/165; F02C 7/06; F02C 7/22; F02C 3/05; F02C 3/08; F02C 5/02; F02C 5/12; F02C 3/045; F02C 3/073; F02C 3/04; F02C 3/002; F04D 29/284; F04D 29/286; F05D 2240/243; F05D 2240/35; F05D 2240/30; F01D 5/043; F01D 5/045; F23C 7/002; F23C 7/004

See application file for complete search history.

(56) References Cited

U.S. PATENT DOCUMENTS

| | | | | |
|---|---|---|---|---|
| 1,174,439 A * | 3/1916 | Pelley | .................. | F02C 5/12 60/39.38 |
| 1,289,960 A * | 12/1918 | Taylor | .................... | F02C 6/003 60/39.17 |
| 2,589,239 A * | 3/1952 | Fallon | ...................... | F02C 3/05 60/805 |
| 2,898,736 A * | 8/1959 | Ely | ........................ | F02C 5/02 60/39.37 |
| 3,059,428 A * | 10/1962 | Galonska | ................ | F02C 3/16 60/39.35 |
| 3,751,909 A * | 8/1973 | Kohler | ................... | F01D 5/148 415/115 |
| 5,730,582 A * | 3/1998 | Heitmann | ............ | B63H 11/08 416/185 |
| 7,124,571 B2 * | 10/2006 | Stanevicius | .............. | F02C 5/02 60/39.39 |
| 2004/0154309 A1 * | 8/2004 | Bernard | ................... | F02C 3/09 60/805 |
| 2017/0058767 A1 * | 3/2017 | Williams | ............... | F02C 3/165 |

* cited by examiner

*Primary Examiner* — Steven M Sutherland
*Assistant Examiner* — Jacek Lisowski
(74) *Attorney, Agent, or Firm* — Richard Eldredge

(57) ABSTRACT

A turbine engine system includes a fire chamber and a helical fan. The fire chamber includes a first cylindrical body having a first central axis; a first elongated hollow shaft extending co-axially along the first central axis; a plurality of wings fixedly secured to an exhaust plate and the first elongated hollow shaft; a plurality of combustion chambers disposed within a thickness of the first cylindrical body; a plurality of fuel injectors; and a plurality of spark plug injectors. The helical fan includes a cylindrical body having a second central axis; a second elongated hollow shaft extending co-axially along the central axis and in gaseous communication with the first elongated hollow shaft; and a plurality of blades extending from an inner wall of the cylindrical body to an outer surface of the elongated hollow shaft.

1 Claim, 5 Drawing Sheets

TURBINE ENGINE WITH A FIRE CHAMBER AND A HELICAL FAN

BACKGROUND

1. Field of the Invention

The present invention relates generally to turbine engines, and more specifically, a long cycle, bladed turbine engine.

2. Description of Related Art

Turbine engines are well known in the art and provide a viable means of converting wind or water energy into mechanical and/or electrical power. In FIGS. 1 & 2, a conventional wind turbine engine system 101 is shown. System 101 depicts a base plate 105, a turbine 103 rotatably mounted on the base plate 105, a plurality of directional fins 109 & 111 carried by the base plate peripherally adjacent to the turbine 103, and a cover plate 107 over the turbine 103 and the plurality of directional fins 109 & 111. A cylindrical body 201 fixedly joins together the peripheral set of asymmetrically profiled vertical blades. The asymmetrical profile of each of the plurality of directional fins 109 & 111, which is similar to an aircraft wing, may favor a double thrust and drag effect which can also accelerate wind flow.

As depicted in System 101, the cover plate has a self-aligning bearing 117 holding the vertical shaft 115 of the turbine and base 105 includes a self-aligning bearing 113. An energy-receiving housing 119 is provided beneath the base plate 105.

Wind turbine engines which are configured similar to that of system 101 commonly encounter short burst cycles where the wind/water energy doesn't stay in contact with the blades very long. Hence, the turbine remains static for a high percentage of its duty cycle leading to high inefficiency. This is viewed as a disadvantage of conventional turbine engines.

Although great strides have been made in the area of turbine engine systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
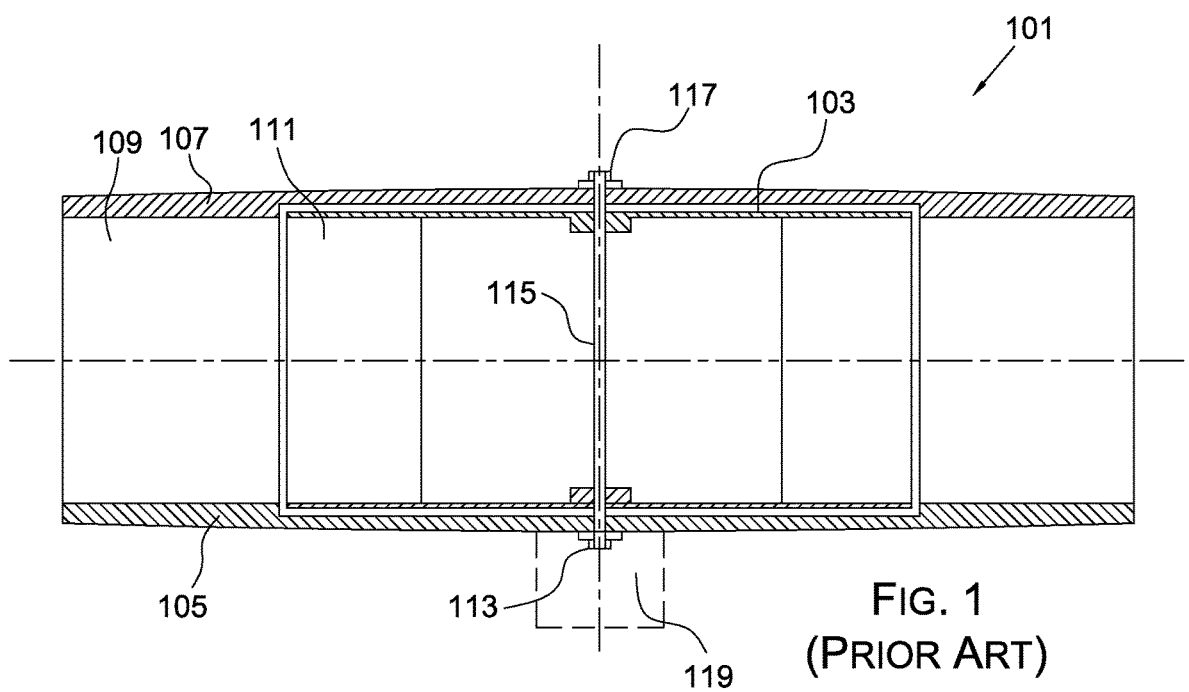
FIGS. 1 & 2 are section views of a conventional wind turbine engine system.
Figure 2:
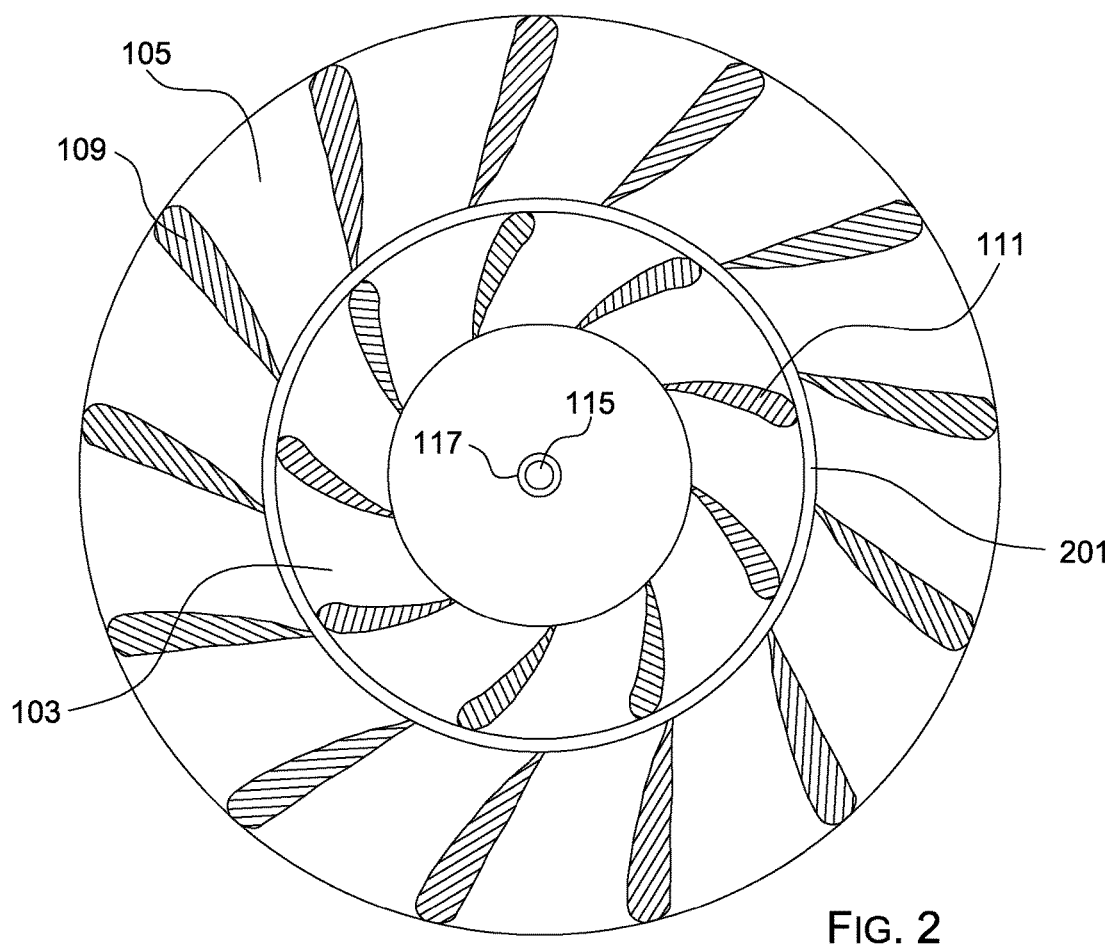

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional turbine engine systems. Specifically, the system of the present application provides a new and useful long cycle, turbine engine which maximizes the use of short bursts of wind/water energy to provide high efficiencies. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
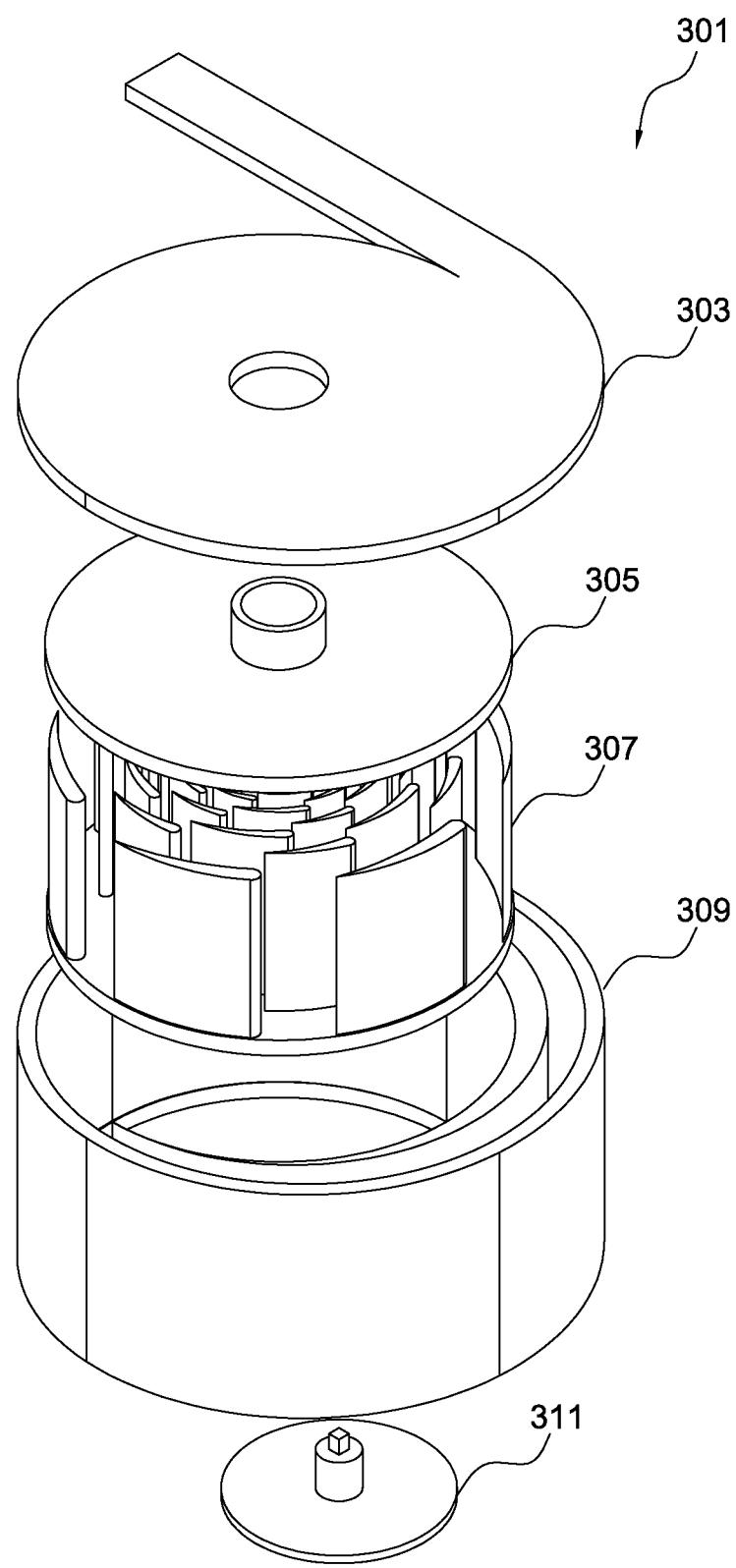
FIG. 3 is an oblique view of a turbine engine system in accordance with a preferred embodiment of the present application.
Figure 4:
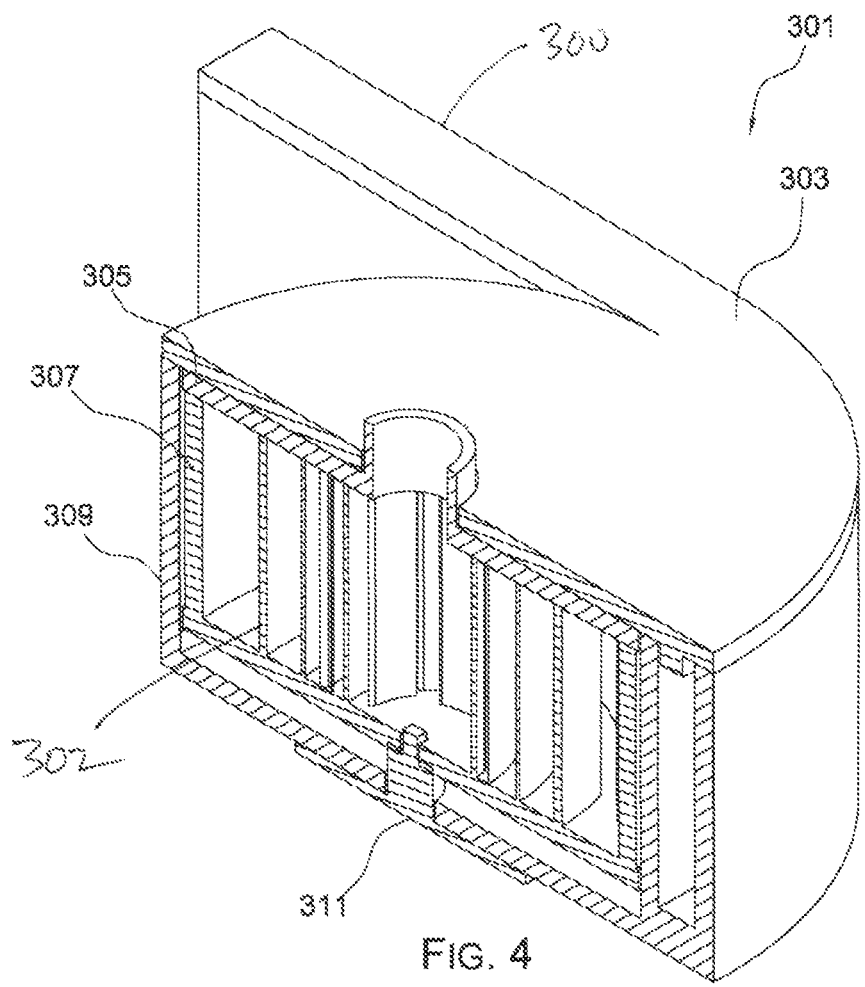
FIG. 4 is an oblique, section view of the turbine engine system of FIG. 3.
Figure 5:
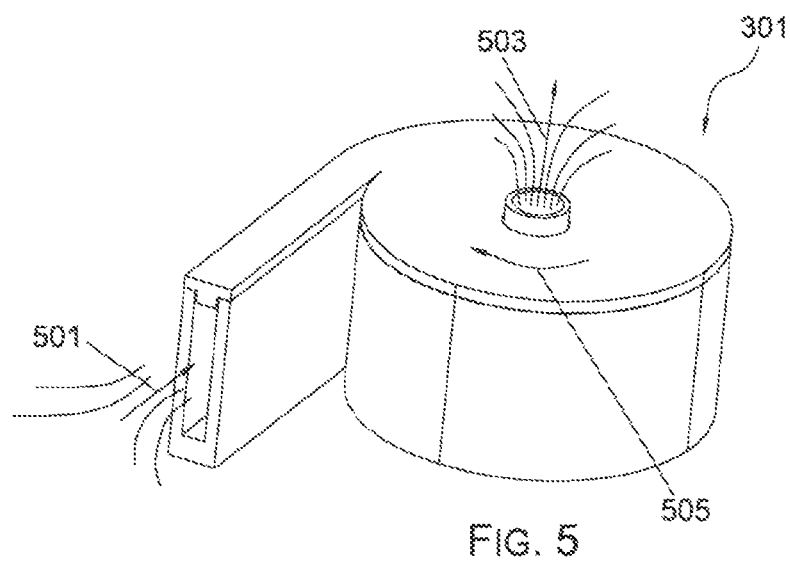
FIG. 5 is an oblique view of the turbine engine system of FIG. 3.

Referring now to the drawings wherein like reference characters identify corresponding or similar elements throughout the several views, FIGS. 3, 4, & 5 depict a turbine engine system in accordance with a preferred embodiment of the present application. It will be appreciated that the turbine engine system 301 overcomes one or more of the above-listed problems commonly associated with conventional turbine engine systems.

In a preferred embodiment, system 301 includes an output shaft 311, turbine case 309, power plate 307, power plate top 305, and cover plate 303. In this embodiment, no combustion is present. The working media, e.g. air, fluid, gas, etc., is inserted into the input port having an elongated shaft 300 in fluid communication with the inner cavity of the turbine case as depicted with arrow 501 which is shown in FIG. 5. The media passes through a single chamber which is formed by the turbine case 309 and cover plate 303 causing the power plate 307 to rotate in direction 505 internally. The power plate top 305 includes a plurality of wings 302 that force the exhaust air 503 to move toward the center passage extending through the top plate 305.

The flow of the working fluid is neither axial nor radial. It is tangential to the power plate 307. Rather than using vanes to translate the kinetic energy of the working fluid into rotational motion, system 301 uses wings whose outer edges are co-radial with the power plate 307 itself. This means that since the path around the inner edge of the wing is longer than the path around the outer edge, the lift created by the wing draws it inward by the Bernoulli effect on the inner surface. This fights the centrifugal force on the wing as the power plate spins. The drag on the wing is what actually powers the turbine. This is viewed as an advantage of the system of the present application.

Figure 6:
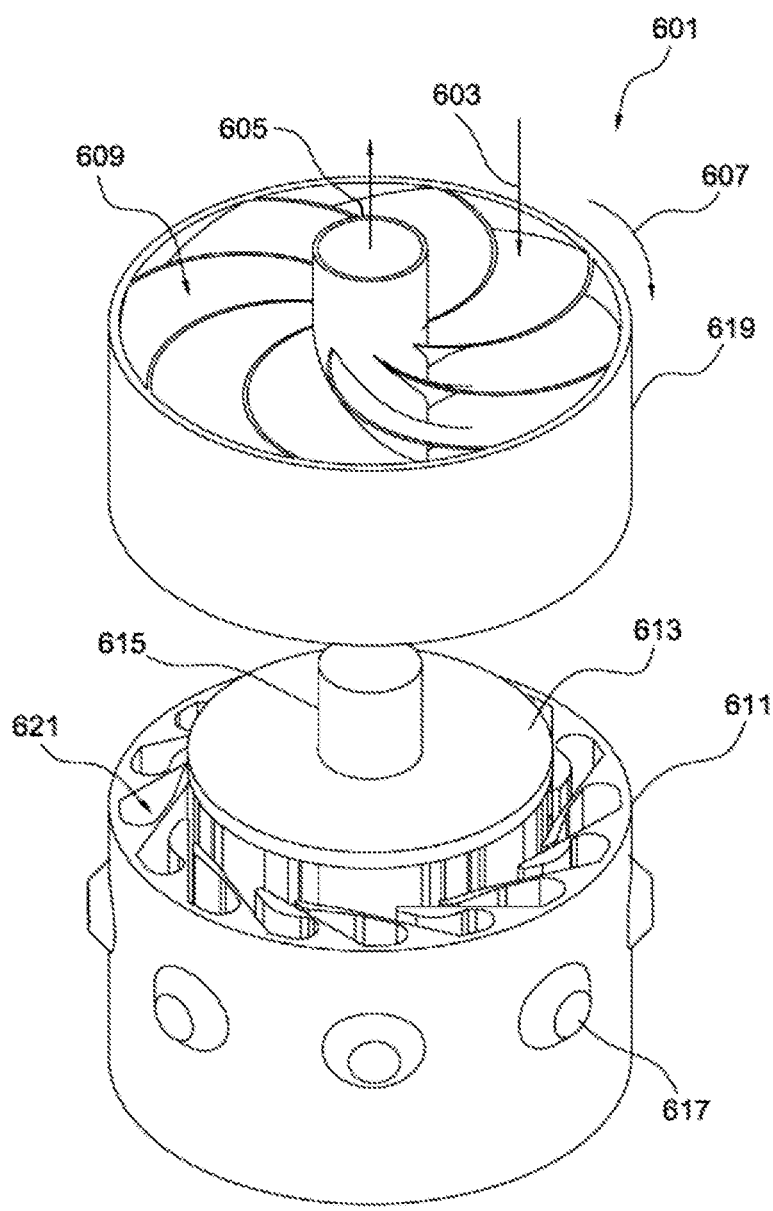
FIG. 6 is an oblique view of a turbine engine system in accordance with an alternate embodiment of the present application.
Figure 7:
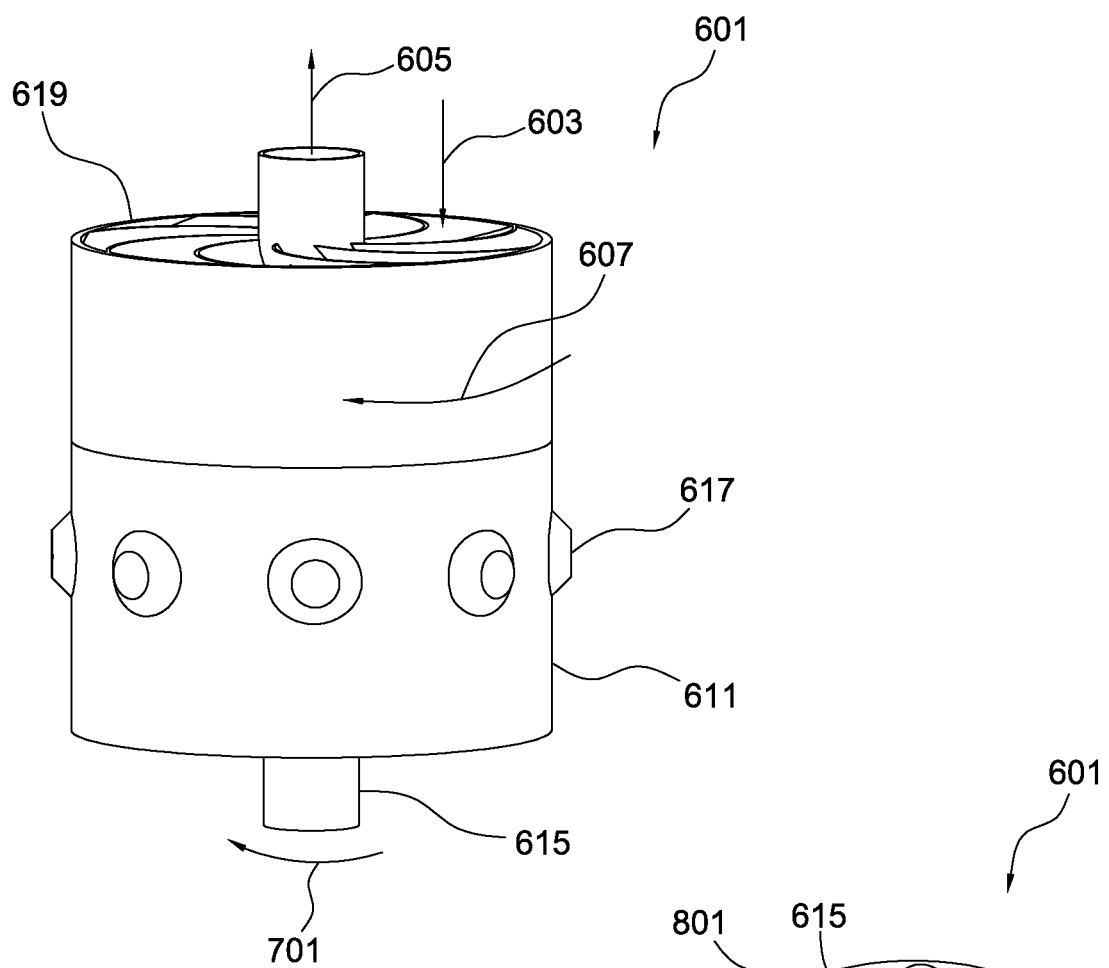
FIGS. 7 & 8 are oblique views of the turbine engine system of FIG. 6.

Referring now to FIG. 6, an exploded view of system 601 is respectively shown in accordance with alternative embodiment of the present application. System 601 is substantially similar in function to system 301 and it is contemplated interchanging the features of the different types of the systems discussed herein.

Figure 8:
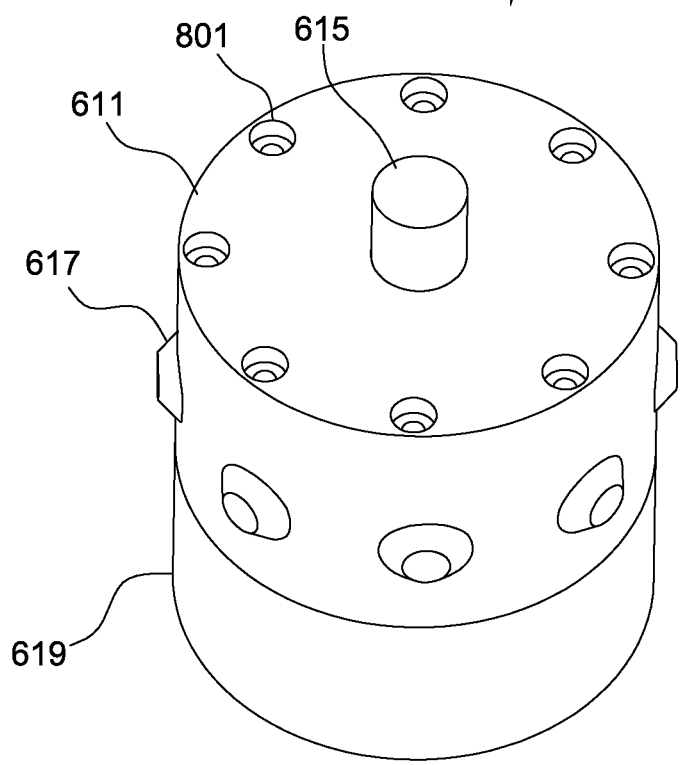

In an alternative embodiment, system 601 includes a helical fan 619 containing a plurality of helical fan blades 609 which is located above the fire chamber 611. The fire chamber 611 contains a plurality of outer wings (not shown) which are co-radial with the plurality of helical fan blades 609. The fire chamber 611 also includes holes 801 which are a provision for spark plug mounting which is shown in FIG. 8. Additionally, the fire chamber includes fuel injectors 617. An exhaust plate 613 forces the exhaust fluid to exit in direction of shaft 605 which is depicted in FIG. 6.

The turbine system 601 needs to be put in motion prior to ignition in order to allow the helical fan 619 to generate enough pressure to keep the burning gasses from backfiring out the helical fan 619. The spinning rotation 607, 701 of the helical fan has two effects. First, it compresses the incoming air 603 downward. Second, it forces the air outward toward the edge of the combustion chamber (where the fuel injector and spark plug are). As the air 603 passes downward into the fire chamber 611, the fuel injector 617 adds fuel to it. The mixture continues downward to the spark plug 801, where it is ignited. The resulting burning gasses have only one path out: through the nozzle at the end of the chamber.

Because of the shape of the individual combustion chambers 621, the incoming air 603 enters power plate (not shown) tangentially to it. As the incoming air 603 strikes the leading edge of a wing (not shown), the drag created by the impact rotates the fire chamber 611. After meeting the leading edge of a wing (not shown), the higher energy fluid will continue outside the wing 621, while the lower energy fluid would be pushed toward the inside. This ensures that the maximum amount of energy will be extracted from the incoming air 603 before it is exhausted in direction of shaft 605, which in turn is in gaseous communication with central shaft 615 of the fire chamber 611.

One or more of the combustion chambers 621 have neither spark plugs nor fuel injectors. These are cooling chambers 600 through which compressed air is forced from the helical fan. As the air in the cooling chamber strikes the combustion chamber, it heats the air and cools the combustion chamber walls 621. The air from the cooling chambers 600 is also forced into the turbine 601, which means that less energy is wasted in heating the combustion chamber 621, and that the burning gasses from the combustion chamber 621 are mixed with air from the cooling chamber, causing them to burn more completely, and cooling the gasses so as not to melt the wings in the fire chamber 611. The proportion of compressed air to the combustion chamber versus air to the cooling chamber can be regulated by a simple valving arrangement.

Since the working fluid is forced into a circular path by the combustion chamber wall (not shown), the highest energy fluid will always be forced to the outside of the fire chamber 611 because of the centrifugal force acting on the incoming air 603. Since the exhaust port is located in the center of the exhaust plate 613, then what is coming out of the exhaust is always the lowest energy working fluid, and high energy fluid will stay in the turbine working until its energy is transferred to rotary motion. This makes the turbine a long cycle turbine and enhances its efficiency. This is viewed as an advantage of the system of the present application.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A turbine engine system, comprising:
   a fire chamber, having:
   a first cylindrical body having a first central axis;
   a first elongated hollow shaft extending co-axially along the first central axis, the first elongated hollow shaft extending along the first central axis;
   a plurality of wings fixedly secured to an exhaust plate and the first elongated hollow shaft;
   a plurality of combustion chambers disposed within a thickness of the first cylindrical body;
   a plurality of fuel injectors extending through the thickness of the first cylindrical body in a direction perpendicular to the first central axis and in gaseous communication with the plurality of combustion chambers; and
   a plurality of spark plug injectors extending through a bottom surface of the first cylindrical body and in a direction parallel with the first central axis and in gaseous communication with the plurality of combustion chambers;
   a plurality of cooling chambers disposed within the thickness of the first cylindrical body and positioned between the plurality of combustion chambers, wherein a cooling chamber of the plurality of cooling chambers is positioned adjacent to a combustion chamber of the plurality of combustion chambers, wherein compressed air is injected into the cooling chamber; and
   a helical fan, having:
   a cylindrical body having a second central axis;
   a second elongated hollow shaft extending co-axially along the second central axis and in gaseous communication with the first elongated hollow shaft; and a plurality of blades extending from an inner wall of the cylindrical body to an outer surface of the second elongated hollow shaft.

* * * * *